R. WELCH.
Hand Seeder.
No. 2,406.  
No. 33,410.
Patented Oct. 1, 1861.
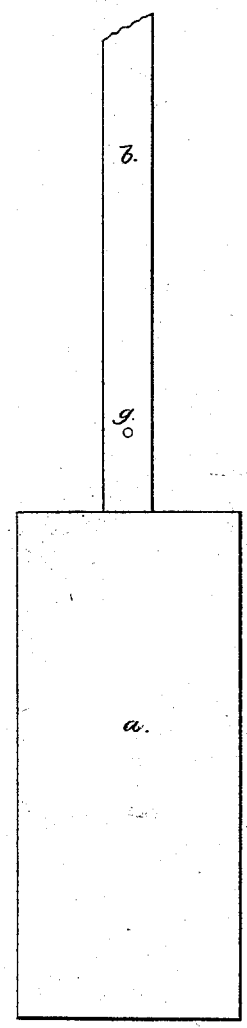
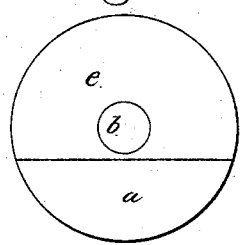
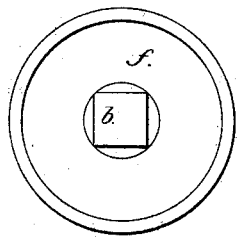
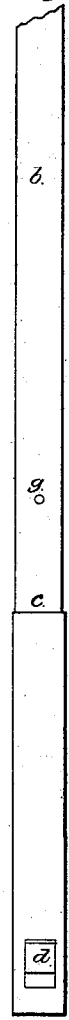
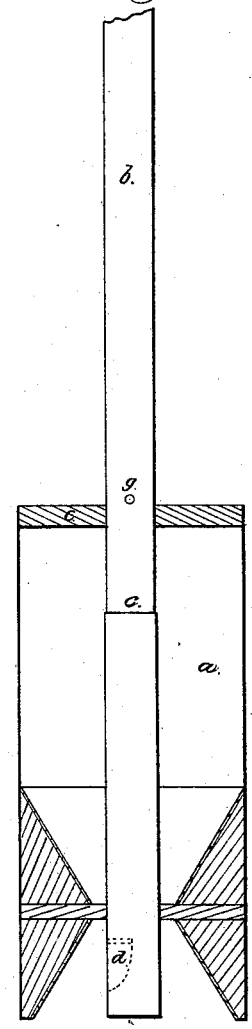
Witnesses:
Wm Kimber Hall  
George Haselton
Inventor:
Rodney Welch  
by his attorney  
Amos Broadnax.

UNITED STATES PATENT OFFICE.

RODNEY WELCH, OF WORTH, ILLINOIS.

IMPROVEMENT IN CORN-PLANTERS.

Specification forming part of Letters Patent No. 33,410, dated October 1, 1861.

*To all whom it may concern:*

Be it known that I, RODNEY WELCH, of Worth, in the county of Cook and State of Illinois, have invented a new and useful Improvement in Corn-Planters; and I do hereby declare that the following is a full, clear, and exact description of the same, reference being had to the annexed drawings, making a part of this specification, and to the letters of reference marked thereon.

The object of this invention is to enable corn to be readily planted by hand as the planter walks over the field; and it consists of a portable vessel with a conical bottom, through which slides a stamper that is a prolongation of the handle by which it is carried. The stamper has a recess near its end, which receives a few grains of corn from the vessel when it is carried by the handle, and when the vessel is rested on the ground and the handle and stamper thrust into the ground by the operator, the seed is deposited from the recess.

To enable others skilled in the art to make and use my invention, I will proceed to describe its construction and operation with reference to the drawings.

Figure 1 is an external view of my improved corn-planter. Fig. 2 is a plan or top view. Fig. 3 represents the handle detached. Fig. 4 is a section, and Fig. 5 is an inverted plan or view, of the bottom of the same.

The vessel $a$ contains the corn to be sown, and is carried by the handle $b$, which is made round at the top and square at the bottom end below the shoulder $c$. At the end of the square stamper, which is but a continuation of the handle $b$, there is a recess, $d$, which is placed at such a distance from the shoulder $c$ that when the shoulder is lifted against the cover $e$ the recess is above the bottom $f$ and within the vessel, ready to receive the grains of corn that are caused to fall into it by the inclined sides of the bottom.

When the instrument is placed on the spot where it is desired to plant the corn, the planter or operator thrusts the handle down until the pin $g$ strikes the cover $e$, by which the recess $d$ is projected outside the bottom, and the grains of corn deposited in the hole thus made, and where they are left when instrument is removed.

It will thus be seen that this corn-planter may be rapidly shifted from hill to hill, and that the natural tendency of the hand of the operator who carries it deposits as many grains in each hill as the capacity of the recess will allow. The number of grains deposited at once may be regulated by corking or plugging the recess. To obviate any risk of bruising the seed, the upper part of the recess is lined with a piece of india-rubber.

What I claim as my invention, and desire to secure by Letters Patent, is—

The combination of a shifting handle furnished with a recess, as described, and a receptacle with a conical bottom, arranged in the manner and for the purpose specified.

RODNEY WELCH.

Witnesses:
M. D. BROWN,
C. E. GRAY.